July 19, 1949.　　　　G. L. BORELL ET AL　　　　2,476,276
AUTOMATIC CONTROL RHEOSTAT
Filed Feb. 24, 1945
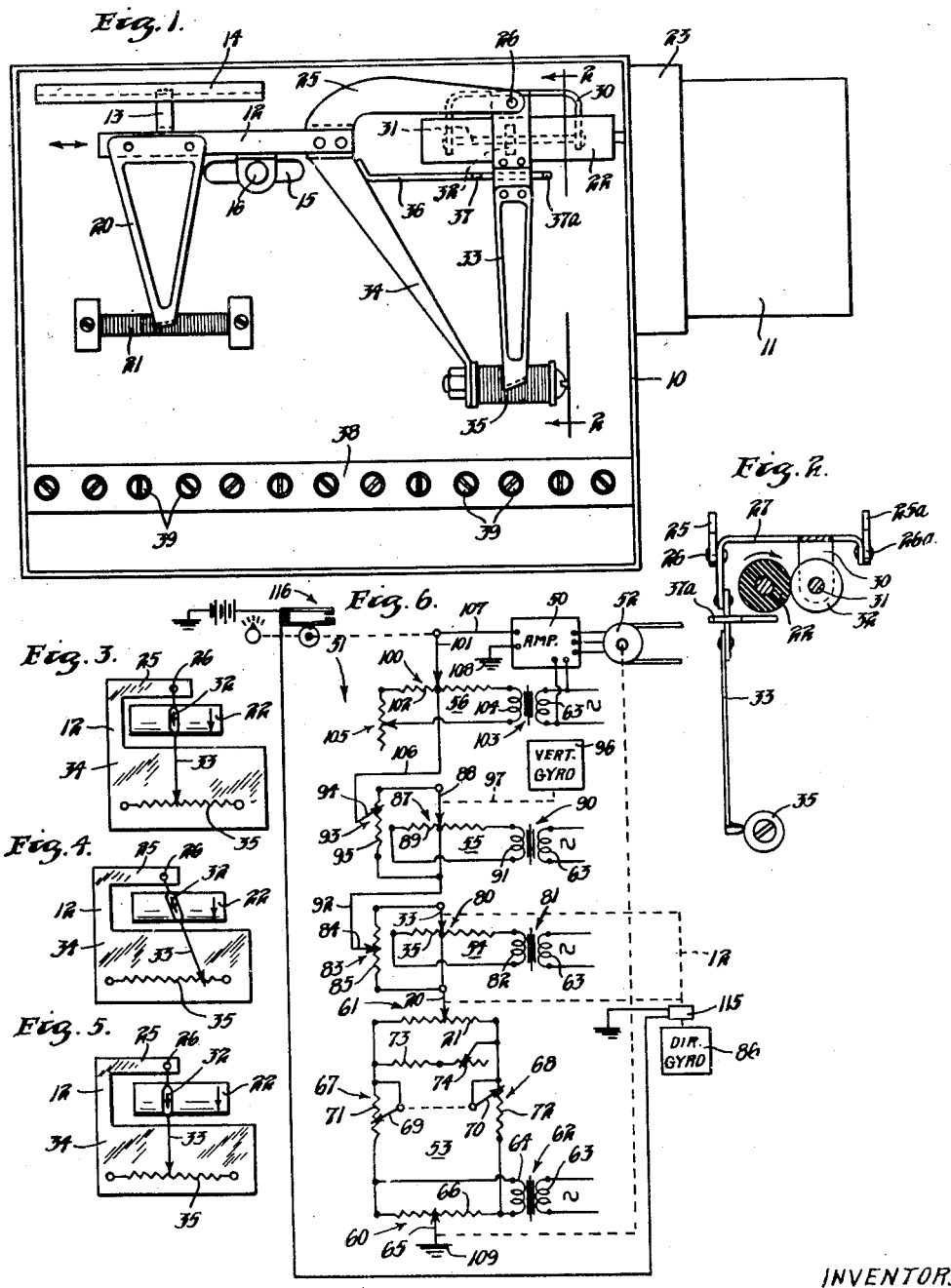
INVENTORS
GEORGE L. BORELL
DANIEL G. TAYLOR
BY George N. Fisher
ATTORNEY Patented July 19, 1949

2,476,276

UNITED STATES PATENT OFFICE 2,476,276

AUTOMATIC CONTROL RHEOSTAT

George L. Borell and Daniel G. Taylor, Minneapolis, Minn., assignors to Minneapolis-Honeywell Regulator Company, Minneapolis, Minn., a corporation of Delaware Application February 24, 1945, Serial No. 579,586

12 Claims. (Cl. 201—55)

Our invention relates generally to control devices and more particularly to such devices which provide a signal which is proportional to the rate of change of a condition.

The majority of control systems are operated by condition responsive devices which are responsive to the magnitude and direction of change of a condition. It is often desirable, however, to provide a condition responsive device which is responsive to the rate of change of condition instead of to the magnitude of the change, and this may be true whether the instrument is measuring temperature, angular deviation, humidity, or other variable which it is desired to control. In the usual condition responsive device, a change in condition is measured by displacement of a member such as the lever or indicator of a thermostat, the vane or indicator of a galvanometer, et cetera. The velocity of this change in condition will be the first derivative of the displacement with respect to time, or, expressed mathematically, $$v = \frac{ds}{dt}$$

Similarly, if a device indicates the velocity or rate of change, the first derivative of this indication will be the acceleration of the change, or, expressed mathematically, $$a = \frac{dv}{dt}$$

In many control systems it is desirable to provide a signal which is proportional to the rate of change of a condition and to use this signal alone or to use it in conjunction with a signal which indicates the absolute value of that condition.

Control devices have been known which provide a signal which is a combination of the signals determined by the deviation of the condition from a predetermined value and by the velocity of change of that condition; but such devices are unsatisfactory where it is desired to vary the amount of the velocity signal independently of the deviation signal. An example of the case where a velocity signal is desired which may be varied independently of the deviation signal is found in the control systems of automatic pilots for operating the controls of an aircraft. It has been found in such systems that more satisfactory results are obtained if the rudder of the craft is displaced a greater amount when the craft is deviating from a fixed heading at a high rate of speed than when the craft is deviating more slowly, or has reached its maximum deviation and is starting to return to the desired heading.

It is therefore a major object of our invention to provide a novel control device which produces a signal proportional to the first derivative of a condition to be measured.

It is another object of our invention to provide such a device which may be combined in a very simple manner with a control device which provides a signal proportional to the deviation of the condition to be measured.

It is a further object of our invention to provide a novel control device for an automatic pilot which will produce a signal proportional to the velocity of deviation of the aircraft from a given heading.

It is a still further object of our invention to provide such a device in which the velocity or derivative signal is entirely separate and independent from any other signal.

It is another object of our invention to provide such a device which is relatively simple but which has a sufficient amount of mechanical power to operate normal system controllers.

It is still another object of our invention to provide a control system wherein signals corresponding to extent and rate of deviation of a condition are separately provided and controlled.

It is a further object of our invention to provide a control system in which the rate of change of a condition may be used to control a condition controlling device.

These and other objects of our invention will become apparent from the following description of a preferred form thereof and from the drawings illustrating that form, in which Figure 1 is an elevational view of our improved control device, Figure 2 is a view taken at 2—2 in Figure 1, Figures 3, 4, and 5 are schematic diagrams illustrating the operation of the device when the operating member is displaced, and Figure 6 is a schematic wiring diagram of a control system used to operate the rudder of an aircraft and illustrating how our invention may be applied thereto.

Referring now to the drawing and particularly to Figure 1 thereof, the numeral 10 indicates a housing to which is attached a small, substantially constant speed motor 11. The motor 11 may be of any suitable type, designed for use on any suitable voltage available, but it should run at a substantially constant speed, though the power output required is not large. Within the housing 10 we provide a slidable carrier 12 which is suitably mounted for horizontal reciprocatory motion, such as might be provided by guides (not shown) on the rear wall of the housing 10 and a slider 13 cooperating with a guide 14. Slider 13 and guide 14, together with the guides on the rear wall of the housing 10, cooperate to permit horizontal movement of the carrier 12 but prevent other translatory motion or rotation. A slot 15 may be provided in the rear wall of the housing 10 through which an operating arm (not shown) may extend and engage an ear 16 which is rigidly attached to carrier 12.

To provide the signal which is proportional to the displacement of the carrier 12 from its normal position, we prefer to mount a wiper 20 on the left end of the carrier 12 so that the wiper moves in synchronism with the carrier. The lower end of wiper 20 bears against a resistor 21 which is mounted on the rear wall of the housing 10, with its axis parallel to the line of movement of the carrier, so that as the wiper is moved along the resistor 21, the resistance between the wiper 20 and a point on the resistor 21 will vary. The resistance 21 may be provided with a center tap; and by properly aligning the carrier 12, it is possible to have the wiper 20 aligned with the center tap when the carrier 12 is in its mid-position, which will generally correspond to its normal position. Any deviation from this normal position will therefore be immediately indicated by a change in resistance between the wiper 20 and the center tap of resistor 21.

Within the housing 10 and driven by motor 11 is a cylinder 22, preferably rubber covered, and mounted so that its axis is parallel to the line of movement of carrier 12. The cylinder 22 is driven at a substantially constant speed, and the minimum value of this speed is determined by the diameter of the cylinder and the anticipated period of the reciprocatory movement of carrier 12. We have illustrated a gear reduction 23 between the motor 11 and the cylinder 22 since it is easier to secure the desired driving speed of the cylinder in this manner.

On the right hand end of carrier 12 we provide a pair of cantilever arms 25 and 25a which extend in a direction generally parallel to the axis of the cylinder 22 and slightly above the latter. Pivots 26 and 26a are provided at the outer ends of arms 25 and 25a, respectively; and mounted thereby is a supporting member 27 which extends between the arms 25 and 25a, bridging over the cylinder 22.

Connected to the supporting member 27, or formed as a part of it, is a yoke 30 whose base extends generally parallel to the axis of the cylinder 22 and whose arms are bent downwardly to carry a shaft 31 which extends generally parallel to the axis of the cylinder 22. Centrally mounted on the shaft 31 so that it is aligned with the pivots 26 and 26a is a roller 32 which bears against and is rotated by the cylinder 22. By arranging the pivots 26 and 26a, the cylinder 22, and the roller 32 in the manner just described, these members cooperate so as to tend to maintain the axis of the roller 32 parallel to that of the cylinder 22 when the latter revolves as shown in Figure 2. If this parallel relationship is disturbed, a force is developed between the cylinder 22 and the roller 32 which attempts to pivot the latter until its axis is parallel to the axis of the cylinder.

Connected to the member 27 and extending downwardly therefrom, we provide a wiper 33 suitably insulated from the member 27 but operated thereby so that wiper 33 may turn about pivots 26 and 26a as roller 32 likewise pivots about them. The caster action of the roller 32 with respect to cylinder 22 is thus transmitted to wiper 33.

Extending downwardly and to the right from the carrier 12 is a support 34 which carries a resistor 35 at its lower end. The resistor 35 is aligned with the pivots 26 and 26a so that wiper 33 may bear against the resistor and traverse it as the wiper rotates about the pivots. In the form shown we have placed the resistor 35 so that its axis is parallel to the axis of the cylinder 22, and its center point is located on a line which is perpendicular to the axis of the cylinder and which passes through the axis of the pivots 26 and 26a. This alignment is maintained as carrier 12 is moved back and forth, since the cantilever arms 25 and 25a and the support member 34 are rigidly attached to the carrier 12 and the whole moves as an integral part. To prevent the wiper 33 from swinging too far and going beyond the ends of the resistor 35, we provide a stop member 36 attached to the supporting member 34 and having a pair of arms 37 and 37a extending forwardly on each side of the wiper 33 to limit the motion of the latter. The resistor 35 may be provided with a center tap; and by properly aligning the support 34 with the pivot points 26 and 26a, the wiper 33 will normally be aligned with the center tap so that any movement of the wiper about the pivot point will be indicated by a change in resistance between the wiper and the center tap. If a voltage source is connected to the ends of resistor 35, any movement of wiper 33 away from the center tap will cause a voltage to appear between the wiper and the center tap thus providing a voltage signal whose magnitude varies as the displacement of the wiper from the center tap.

To complete the control device, a terminal strip 38 having a series of terminals 39 thereon may be installed in the lower portion of the housing 10; and all connections to wipers, resistors, and motor 11 may be made thereon.

Operation of device

In the operation of our device, it will be apparent that movement of the ear 16 by the operating member of the condition responsive device will cause the wiper 20 to move across the resistor 21, thereby providing a signal in the manner previously described. However, the operation of the wiper 33 and the resistor 35 is not so obvious, and for a clearer understanding of this portion of the device, reference should be had to Figures 3, 4, and 5. In these figures the schematic representations of the various parts have been given the same reference numerals as the parts just described.

Starting at Figure 3, it will be seen that a wiper 33, pivotally mounted at 26, makes contact with a resistor 35 while a roller 32 is mounted on wiper 33 and bears against rotating cylinder 22. The numerals 25 and 34 indicate the cantilever arms and the support, respectively. As previously mentioned, the cylinder 22, the roller 32, and the pivoted wiper 33 cooperate to urge the roller to assume a position wherein its axis is parallel to the axis of the rotating cylinder or, expressed differently, so that the plane of the roller is perpendicular to the axis of the cylinder.

However, if the carrier 12 is now moved to the left, as indicated in Figure 4, the roller 32 will tend to lag behind because of the restraint imposed upon it by the cylinder 22, which is rubber covered to prevent the slipping of the roller upon it. When the roller 32 lags behind the pivot point 26, wiper 33 is moved about the pivot point so as to rotate counter-clockwise, as shown in Figure 4, thereby moving across resistor 35 and causing a signal to be generated as previously described. As carrier 12 is moved, the roller 32 lags behind the pivot point 26 until the angle between the axes of the roller and the cylinder 22 is great enough to allow the roller to move at the same rate as the carrier, the size of the angle, of course, depending upon the speed of the carrier. The displacement of wiper 33 on resistor 35 will thus be proportional to the rate of displacement of carrier 12, and the voltage signal produced will likewise be proportional to the same rate of displacement. The force tending to return the axis of roller 32 to its position parallel to the axis of cylinder 22 is acting during the time, but it is overcome by the movement of carrier 12. As the rate of movement of the carrier 12 decreases, however, this force urges the wiper 33 toward its original position; and as the carrier comes to rest, the wiper will approach the position of the center tap, as shown in Figure 5.

If the carrier 12 were moved to the right instead of to the left, the roller 32 and wiper 33 would be restrained as before, but instead of the wiper's being moved toward the right end of resistor 35, it would be moved toward the left end and would then center itself as previously described.

If the cylinder 22 were not rotating, and if carrier 12 were moved toward the right, roller 32 would be restrained against lateral movement by the friction between it and the rubber of cylinder 22, and hence wiper 33 would be displaced toward the left end of resistor 35. However, when the carrier 12 reached its final position, there would be no restoring force tending to re-align roller 32 with cylinder 22, and hence the signal put in by wiper 33 and resistor 35 would be left in even though there were no further need or desire for it. However, as the surface speed of the cylinder 22 is increased, wiper 33 will lag less and less behind pivot point 26. Hence, unless a mechanical linkage is used or the characteristics of the electrical system are materially changed, a much smaller signal will be provided when the cylinder 22 is turned at a greater rate of speed.

When the anticipated speed of the carrier 12 has been determined, the minimum speed of the cylinder 22 may then be determined. This may be done experimentally, but it is generally preferable to do it mathematically since an experimental determination will require more time and materials to be expended on a relatively simple problem. It may be shown that when the roller 32 is turned so that its axis is at an angle to the axis of the cylinder 22, the path it then traces on cylinder 22 as it returns to its normal position will be a tractrix. The equation for a tractrix may be found in mathematics texts (e. g. page 331 of Osgood's Advanced Calculus) and is $$y = (k^2 - x^2)^{\frac{1}{2}} - k \log_e \frac{k + (k^2 - x^2)^{\frac{1}{2}}}{x}$$

In this equation $x$ is the lateral displacement of the roller 32 measured from a line which passes through the axis of the pivot points 26 and 26a and which extends perpendicular to the axis of the cylinder 22; $y$ is the distance which the surface of the cylinder 22 has moved; and $k$ is the distance between the point of contact between cylinder 22 and roller 32, and the axis of the pivot points 26 and 26a.

Since a tractrix approaches an asymptote, theoretically the roller 32 will never return to its normal position once it has been displaced. However, because of the physical size of the wire used in resistor 35, it is unnecessary that the exact position be regained, since if the wiper 33 touches the desired turn of the resistor element, the effect is the same. Since the anticipated speed of displacement of the carrier 12 is known or may be estimated, the necessary speed of the cylinder 22 may be calculated by suitable mathematical analysis, or may be determined by experimental means. By way of example only, and not as a limitation, in one application of this device it was anticipated that carrier 12 would be oscillated back and forth at a rate of one cycle in approximately two or three seconds. The diameter of cylinder 22 was approximately three-eighths of an inch, and under these conditions it was found that when the cylinder was rotated at approximately 120 revolutions per minute, very satisfactory results were obtained and a velocity signal was obtained from resistor 35. In this case, a mathematical analysis was first made to determine the necessary rotational speed, and this was later verified by experimental results. It may be shown that by a proper choice of surface speed of the cylinder 22, the wiper 33 may be caused to be displaced an amount proportional to the velocity of movement of the carrier 12, and thus we have secured the first derivative of the displacement of the carrier 12.

Construction of system

One of the features of our invention is the design of a control system in which a velocity signal is provided that may be controlled independently of a deviation signal. It will be apparent that a system such as this will have application in temperature control systems where it is desirable to have a type of anticipating control which will provide a greater quantity of fuel for the heater when the temperature is dropping rapidly than when it is merely drifting away from the desired point. In addition, however, our system finds one of its greatest uses in the field of aircraft control systems such as the automatic pilot. An example of such a system is found in the copending file of Robert J. Kutzler and Theodore J. Wilson, Serial No. 469,626, filed December 21, 1942. In Figure 6 we have illustrated how their control system may be modified to use our improved control device and thereby secure superior operation. We have shown only the rudder network with its associated amplifier and servomotor since the other networks, the aileron and elevator networks, are independent of the rudder network in both the original system and in our improved system.

As shown in Figure 6, an amplifier 50 receives power from a source of alternating current (not shown) and also receives signals from a network 51. In accordance with these signals, the amplifier 50 controls the operation of a servomotor 52 to position the rudder (not shown) of an aircraft by means of cables.

The network 51 includes a bridge 53 and three smaller networks 54, 55, and 56, all connected in series with the bridge 53 and amplifier 50. Bridge 53 includes a rebalancing potentiometer 60, a deviation potentiometer 61, and a source of power such as a transformer 62 having a primary winding 63 and a secondary winding 64. The rebalancing potentiometer 60 has a wiper 65 which bears against a resistor 66 whose ends are connected to the secondary terminals of transformer 62. The deviation potentiometer 61 is the same as that previously described in the description of our control device and includes wiper 20 which bears against resistor 21. One end of resistor 21 is connected through a centering potentiometer 67 to the corresponding end of resistor 66, and the opposite end of resistor 21 is connected through a centering potentiometer 68 to the corresponding end of resistor 66. Centering potentiometer 67 has a wiper 69 which bears against a resistor 71, and similarly, centering potentiometer 68 has a wiper 70 which bears against a resistor 72. Wiper 69 is electrically connected to one end of resistor 71, and wiper 70 is similarly connected to one end of resistor 72. It will thus be seen that by changing the position of wipers 69 and 70, a greater or lesser amount of resistors 71 and 72, respectively, will be shorted; and the two wipers 69 and 70 are mechanically connected together so that as a greater portion of one resistor is shorted a smaller portion of the other is shorted. The resistors 71 and 72 each have the same total resistance so that a circuit traced through potentiometers 67, 61, and 68 will have the same value regardless of the position of the wipers 69 and 70. The only effect of the potentiometers 67 and 68, therefore, is to shift the point on resistor 21 at which wiper 20 must be located in order for a balanced bridge to result for a given setting of wiper 65 on resistor 66. To complete the bridge, a branch consisting of a fixed resistor 73 and a rheostat 74 is connected in parallel with deviation potentiometer 61. Wiper 65 of rebalancing potentiometer 60 is grounded at 109, and wiper 20 of deviation potentiometer 61 is connected to network 54.

Network 54 includes a velocity potentiometer 80 consisting of wiper 33 and resistor 35, previously described, and a source of power such as a transformer 81 having a secondary winding 82 and a primary winding 63. It will be noted that the primary winding of transformer 81 is given the same reference numeral as that of the primary winding of transformer 62, since it is generally more convenient in this system to use a transformer having a plurality of secondary windings and but a single primary winding. However, individually energized transformers may be used if desired. The ends of resistor 35 are connected to the terminals of the secondary 82 of transformer 81, and a center tap is provided on resistor 35 which is connected to wiper 20 of the deviation potentiometer 61. A voltage divider potentiometer 83, consisting of a wiper 84 which bears against a resistor 85, has its lower end connected to the center tap of resistor 35, and the upper end is connected to wiper 33 of the velocity potentiometer 80.

Since the ends of resistor 35 are connected to a voltage source, a voltage will appear between the center tap of the resistor and wiper 33 thereof whenever the wiper is displaced from its center position; and the amount of this voltage which is transmitted to the remainder of the network 51 may be selected by positioning wiper 84 of the voltage divider potentiometer 83. It will be seen that when wiper 84 is at the lower end of resistor 85, none of the voltage developed between the wiper 33 and the center tap of resistor 35 will be transmitted to the remainder of the network 51; but the voltage developed in bridge 53 will be transmitted without change to the remainder of the network. If the wiper 84 is at the upper end of resistor 85, the entire voltage developed between the wiper 33 and the center tap of resistor 35 will be transmitted through the remainder of the network as will all of the voltage signal developed in bridge 53. It will thus be seen that we have provided means for producing a velocity or first derivative signal which is independent of a deviation signal and which may be independently controlled.

To operate the wipers 20 and 33 we provide an azimuth responsive instrument such as a directional gyroscope 86 which operates the wipers through a mechanical means 12 corresponding to the carrier 12. The particular form of the azimuth responsive instrument 86 forms no part of our invention, since such instruments are well known in the art, the most important limitation being that the instrument be provided with an indicating means which may engage the ear 16 as shown in Figure 1.

Network 55 includes a potentiometer 87 having a wiper 88 and a center tapped resistor 89 which is energized by a suitable source of power such as a transformer 90 having a secondary winding 91 and a primary winding 63. A conductor 92 connects wiper 84 of the voltage dividing potentiometer 83 to the center tap of resistor 89; and since the ends of the latter resistor are connected to the secondary terminals of transformer 90, any movement of wiper 88 away from the center position will cause a voltage to appear between the wiper and conductor 92. To provide means for varying the amount of this voltage which is available for transmission to the rest of the network 51, we provide a second voltage dividing potentiometer 93 having a wiper 94 which bears against a resistor 95. One end of resistor 95 is connected to wiper 88 and the other end thereof is connected to conductor 92 so that the amount of signal available from network 55 may be varied from a minimum when the wiper is at the lower end of resistor 95 to a maximum when wiper 94 is at the upper end of the resistor.

To operate wiper 88, we provide a vertical gyroscope 96 connected to the wiper by means of a linkage 97 so arranged that as the plane banks or rolls about its longitudinal axis wiper 88 is moved away from its center position for reasons hereinafter described. As the aircraft returns to its level flight, wiper 88 is returned to its center position, and should the craft roll in the opposite direction, wiper 88 will be moved toward the other end of resistor 89.

Network 56, the remaining network in the series, is provided so that the pilot may turn the aircraft without disturbing any of the other adjustments which have previously been made. Included in network 56 are a turn control potentiometer 100 having a wiper 101 which bears against a center tapped resistor 102, and a source of power such as a transformer 103 having a secondary winding 104 and a primary winding 63. One end of resistor 102 is connected to one of the secondary terminals of transformer 103, and the other end is connected through a rheostat 105 to the remaining secondary terminal. A conductor 106 connects wiper 94 of the second voltage divider potentiometer 93 to the center tap of resistor 102, and wiper 101 of the turn control potentiometer 100 is connected to one of the input terminals of amplifier 50 by conductor 107. As in previous cases, any displacement of the wiper 101 from its center position will cause a voltage to appear between conductor 106 and the wiper, the amount of this voltage depending upon the degree of displacement of the wiper and the voltage applied across the ends of the resistor 102. To vary the voltage which appears thereacross, we provide rheostat 105 connected in series with resistor 102 so that while the output voltage of the secondary winding 104 remains a constant, the voltage which appears across the resistor 102 may be varied to conform to the requirements of a particular aircraft.

To complete the input circuit to amplifier 50, the remaining input terminal is grounded as at 108 and the wiper of the rebalancing potentiometer 60 is grounded as stated at 109. The amplifier 50 is constructed so that when an A. C. voltage signal is impressed upon its input terminals, an output circuit is energized which will cause the connected servomotor 52 to rotate in one direction. If the phase of the input voltage is reversed, the amplifier 50 will complete another output circuit which will cause the servomotor 52 to drive in the opposite direction. The design and construction of the amplifier 50 and servomotor 52 as such form no part of our invention, since such devices are known in the art and may be seen in the patents to Whitman 1,942,587 or Anschutz-Kaempfe 1,586,233.

The operation of the amplifier 50 and motor 52 is such that the motor will continue to operate so long as a voltage signal is impressed upon the input terminals of the amplifier. Therefore, in order to secure the balancing action which we require, we operate the wiper 65 of the rebalancing potentiometer 60 by the servomotor 52 so that as the motor operates, the wiper 65 is moved across resistor 66 to balance out the signal causing operation of the motor. This mechanical connection is indicated by the dotted line extending from the servomotor 52 to the wiper 65.

Of the various potentiometers in the network 51, the rebalancing potentiometer 60 is controlled by the servomotor 52 as just described, the deviation potentiometer 61 is controlled by the azimuth responsive instrument 86, as is the velocity potentiometer 80, and potentiometer 87 is controlled by the vertical gyroscope 96. The remaining potentiometers are manually operated, and these include the centering potentiometers 67 and 68 which are mechanically connected to a single operating knob, the ratio rheostat 74, the first voltage dividing potentiometer 83, the second voltage dividing potentiometer 93, the turn control potentiometer 100, and the rheostat 105.

*Operation of system*

In the operation of the system shown in Figure 6, let it be assumed that the aircraft is in the air and has acquired a heading in azimuth which it is desired to maintain. Under these conditions, the rudder will normally be in a streamlined position, or if there is some drag or other force tending to cause the plane to turn in azimuth, the rudder will be slightly displaced from streamlined to compensate for this turning force. Since the servomotor 52 is connected to the rudder by cables, this particular position of the rudder will cause the motor to assume a definite position which will be transmitted to the wiper 65 of the rebalancing potentiometer 60. To maintain the craft in the desired heading, the pilot will center the wiper 20 of the deviation potentiometer 61, and the wiper 33 of the velocity potentiometer 80 will thereupon automatically center itself if the cylinder 22 is rotating. The plane is assumed to be flying with the wings level; and wiper 88 of potentiometer 87 will be aligned with the center tap of resistor 89 by the vertical gyroscope 96 when these conditions are met. The wiper 101 of the turn control potentiometer 100 should be centered, and networks 54, 55, and 56 will now be balanced so that they produce no voltage signals which would be transmitted to the amplifier 50. Bridge 53, however, may or may not be balanced; and it is essential that this bridge, along with all the other networks, be balanced before the control system is engaged. The balancing operation is performed by varying the position of wipers 69 and 70 of the centering potentiometers 67 and 68, respectively, so that the electrical position of wiper 20 of the deviation potentiometer 61 is shifted so that it has a position corresponding to that of wiper 65 of the rebalancing potentiometer 60. Shifting the electrical position of wiper 20 of the deviation potentiometer 61 is accomplished by increasing the effective resistance of one of the centering potentiometers while at the same time decreasing the effective resistance of the other centering potentiometer so that while the wiper 20 remains stationary the effect is the same as if resistor 21 had been moved beneath it.

When the entire network 51 is in balance so that there is no voltage signal appearing between conductor 107 and ground, the system may be engaged so that the amplifier 50 will thereafter control the servomotor 52. Under these conditions, the plane will fly in a straight course in the heading desired until some external force causes it to change that heading. As soon as the heading changes, the azimuth responsive instrument 86 will cause the carrier 12 to move wiper 20 of the deviation potentiometer 61 an amount corresponding to the deviation in heading. At the same time, as has been previously explained, the movement of the member 12 will cause the wiper 33 of the velocity potentiometer 80 to be displaced from its center position on the resistor 35, the amount of this displacement depending upon the speed of deviation of the plane from the desired heading. The signal from deviation potentiometer 61 will be transmitted to network 54, through conductors 92, 106, and 107, to amplifier 50 where it will cause the servomotor 52 to operate to reposition the rudder. By properly phasing the various elements of the system, the rudder will be turned so that it tends to return the craft to its original heading and thereby maintain the craft on the proper course. In addition to the signal from bridge 53, the velocity signal from network 54 will be added to the deviation signal so that if the craft is deviating from the desired heading at a relatively high rate an additional amount of movement of the servomotor 52 will be had to stop the deviation of the craft that much sooner. If the deviation is at a relatively low rate of speed, a much smaller velocity signal will be produced, since less rudder control surface is needed in order to stop the deviation.

As the servomotor 52 is operated to reposition the rudder, wiper 65 of the rebalancing potentiometer 60 is likewise repositioned in such a direction as to attempt to rebalance bridge 53. When this balanced condition is reached, the craft has reached its point of maximum deviation and its angular velocity is zero; the wiper 33 of velocity potentiometer 80 is therefore at the midpoint of resistor 35; and since the bridge is balanced, no signal will be transmitted to the amplifier 50 and operation of the servomotor 52 will cease. However, the previous operation of the servomotor 52 has displaced the rudder from its streamlined position and hence the craft will start to return towards its original heading. As this occurs, wiper 20 of the deviation potentiometer 61 will be returned towards its center position, thereby unbalancing the bridge; and the amplifier 50 will thus receive a voltage signal opposite in phase to that first mentioned, which will cause the servomotor 52 to be operated in the opposite direction, thereby returning the rudder towards streamlined position and also moving wiper 65 of the rebalancing potentiometer 60 towards its normal position. As the wiper 20 of the deviation potentiometer is returned toward center, wiper 33 of velocity potentiometer 80 will be displaced from center in the direction opposite to that in which it was originally displaced. The effect of this will be to increase the signal applied to the amplifier 50 tending to streamline the rudder, so that there will be less tendency for the craft to overshoot or turn past its original heading. If the plane is returning towards its original heading very slowly the amount of velocity signal will be very small; whereas if the plane is returning more rapidly, the amount of velocity signal will be greater and the rudder will more nearly approach streamlined position or possibly even be moved past streamline to a position on the opposite side. The amount of the available velocity signal which is used in the system may be varied by moving wiper 84 of the voltage divider potentiometer 83.

Network 55 comes into operation whenever the aircraft banks or rolls about its longitudinal axis, whether this happens because of air conditions, or because of control by the pilot, as described later. The potentiometer 87 is connected to the vertical gyroscope 96 so that any rolling of the craft about its longitudinal axis will cause movement of wiper 88 with respect to resistor 89, thereby causing a voltage signal to appear across the ends of potentiometer 93. The secondary 91 of transformer 90 is connected to resistor 89 so that the phasing of the signal appearing across potentiometer 93 is such as to cause the amplifier 50 to operate the servomotor 52 so as to drive the rudder in the direction opposite to that in which the craft is banking, e. g., if the plane is banking to the left, the network 55 introduces a signal tending to drive the rudder to the right.

If the aircraft, in the course of its flight, should encounter air currents which cause one wing to drop suddenly, there being no other forces tending to turn the craft, there will be a tendency for the craft to turn toward the wing which is lower. However, when the wing drops, the vertical gyroscope 96 will move wiper 88 with respect to resistor 89, and the rudder will be driven in the opposite direction, thus maintaining the craft on its heading, while the aileron circuit (not shown) operates the ailerons to restore the craft to level.

This effect, which is very desirable, is only incidental, however, to the principal reason for the network 55. When a signal is introduced into the network 51 by the turn control potentiometer 100, as described hereinafter, it is desirable to have a large initial movement of the rudder, and then to have the rudder returned toward streamlined position while the craft remains in the turn. This is accomplished by making the signal from the turn control potentiometer 100 as large as is necessary by adjustment of the rheostat 105, and then counteracting part of this signal by one of opposite phase from network 55. The object of this action is to coordinate the turn of the aircraft so that no skidding or slipping results, and a reduced rudder deflection, once the turn has been established, is necessary to do this. A human pilot will perform the same operations in making a coordinated turn. The amount of singal introduced into the network 51 by the network 55, for a given degree of bank, is determined by the position of wiper 94 of the voltage dividing potentiometer 93, and this is usually adjusted once in flight and then left alone.

Network 56 is included to provide the pilot with means to change the heading of the plane without disturbing any of the adjustments previously made. He may do this by moving wiper 101 of the turn control potentiometer 100 away from the center tap of resistor 102. The voltage signal developed thereby will be transmitted to amplifier 50 where it will operate the servomotor 52 to reposition the rudder in the desired direction and also to move the wiper 65 of the rebalancing potentiometer 60 until the entire network 51 is in balance. However, the azimuth responsive instrument 86 is designed to detect just such changes in heading; and hence when the turn control potentiometer 100 is used, the azimuth responsive instrument 86 must be disconnected from the mechanical means 12, or other means must be provided to lock the deviation potentiometer 61 with the wiper 20 thereof in center position. To secure this action, we prefer to provide a locking means 115 which may conveniently be operated by a cam-operated switch 116 controlled by the same shaft which operates the turn control potentiometer 100. When the turn has been completed, the holding means may be unlocked or the azimuth responsive instrument may again be connected to mechanical means 12 and the aircraft will thereafter maintain the new heading.

As is well known to those who pilot airplanes, when the speed of the craft through the air is relatively low, a greater movement of the control surfaces is necessary to effect a given maneuver than when the plane is flying at a higher air speed. If the same amount of control is used at the higher speed, a "hunt" will develop which indicates that the pilot is "overcontrolling." To obtain the proper operation of the craft at this speed, the movement of the control surfaces must be decreased, but if this smaller movement were used at a lower air speed the response of the aircraft would be very sluggish, and it would require an unnecessarily long time for the craft to return to its proper heading and attitude.

To provide for the different amounts of control which must be used under these different conditions, resistors 73 and 74 are connected in parallel with resistor 21 of the deviation potentiometer 61. The action of resistors 73 and 74 is to provide means for varying the total resistance of the parallel circuits including these resistors and resistor 21. The parallel circuit, consisting of resistors 21, 73, and 74 considered as a unit, and centering potentiometers 67 and 68 are all in series; and it is a characteristic of series circuits that the voltage drop across any individual resistor is to the total voltage applied to the series circuit as the resistance of that individual resistor is to the total resistance of the series circuit. In bridge 53 the voltage supplied by the secondary 64 of transformer 62 remains constant, and the combined resistance of potentiometers 67 and 68 remains a constant. As the effective resistance of rheostat 74 is decreased, the resistance of the parallel circuit consisting of resistors 21, 73, and 74 is also decreased; and hence it will be seen that the voltage applied to the ends of resistor 21 will be decreased. Similarly, as the effective resistance of rheostat 74 is increased, the voltage applied to resistor 21 will likewise be increased.

The effect of this change in voltage applied across resistor 21 of the deviation potentiometer 61 will be to change the amount of control surface movement there will be for a given deviation of the aircraft in azimuth. This result is caused by the fact that the system is a voltage responsive system. If movement of wiper 20 to one end of resistor 21 will cause a voltage signal of, say, three volts to be produced at one time, the servomotor 52 will drive the wiper 65 of the rebalancing potentiometer 60 until the three volt signal is balanced out. However, if the setting of rheostat 74 is changed so that when wiper 20 is at one end of resistor 21 a six volt signal is provided; servomotor 52 will thereupon drive wiper 65 until the six volt signal is balanced out. Since the voltage which is applied across resistor 66 of the rebalancing potentiometer 60 remains a constant, it will be seen that by adjusting rheostat 74 a greater or lesser movement of the rudder may be secured for a given degree of variation from the desired heading.

It will thus be seen that we have provided an improved means of controlling the flight of an airplane with particular regard to the control of the rudder. In actual operation this system has shown itself to be decidedly superior to other means where no velocity control is provided and also superior to means wherein the velocity signal is provided as a part of the deviation signal. With our improved means, the amount of velocity signal may be varied from zero to a relatively high value, and it is thus possible to adjust this signal for the particular plane in which our system is installed. Since the adjustment is electrical in nature, it may be placed upon the control panel of the automatic pilot where it is under the control of the human pilot, and he may thus secure the most accurate flight possible under the existing air conditions.

It will also be seen that we have provided a control device which will furnish a velocity or derivative signal, the magnitude of which may be varied within very large limits. In addition, this derivative signal is entirely independent of any deviation signal, and hence may be separately controlled. We have shown and described our device as it may be applied to the control system of an automatic pilot for aircraft, but it will be apparent that if the ear 16 is connected to the indicating arm of a thermostat or to a galvanometer, the velocity of deviation of innumerable other conditions may be measured and used to control operating mechanisms.

While we have shown and described a preferred form of our invention, we do not wish to be limited to the particular form and arrangement of parts herein shown and described except as limited by the following claims.

We claim as our invention:

1. A device for providing a signal which is proportional to the first derivative of a condition, said device comprising: a control means having two elements having a normal predetermined relationship but relatively movable with respect to each other to produce a controlling effect; means responsive to a change in said condition tending to cause relative movement of said elements of said control means from said predetermined normal relationship by an amount proportional to the change in said condition; and means tending whenever said elements are in other than said predetermined relationship to return said elements to said predetermined relationship at a timed rate.

2. A device for providing a signal which is proportional to the first derivative of a condition, said device comprising: a control means having two elements having a normal predetermined relationship but relatively movable with respect to each other to produce a controlling effect; and means responsive to said condition to cause relative movement of said elements of said control means from said predetermined normal relationship, said last named means comprising a constantly rotating member, and a member carried by one of said elements and in rolling engagement with said rotating member.

3. A device for providing a signal which is proportional to the first derivative of a condition, and including: a member movable in accordance with said condition; a control means operated by movement of an element thereof and mounted for movement with said member; operating means adapted to move said element when said member is moved; and means adapted to restrain said operating means when said member is moved, and to tend to return said operating means to a predetermined position with respect to said control means whereby said control means is operated in accordance with the velocity of said member.

4. A device for providing a signal which is proportional to the first derivative of a condition, and including: a member movable in accordance with said condition; a control means operated by movement of an element thereof and mounted for movement with said member; a cylinder adapted to be rotated; pivotally mounted operating means adapted to move said element of said control means; and a roller carried by said operating means so as to bear against said cylinder with its axis normally parallel to the axis of said cylinder and be rotated thereby, said roller, said cylinder, and said operating means cooperating to restrain a point on said operating means displaced from said pivot point when said pivot point is moved, and to tend to return said means to its normal position, said pivot point moving with said first member.

5. A device for providing a signal which is proportional to the first derivative of a condition, and including: a control means having an impedance member and an impedance controlling means having a normal predetermined relationship but relatively movable to produce a change in impedance of said member; means responsive to said condition to cause relative movement of said impedance member and said impedance controlling means from said predetermined relationship to change the impedance of said member; and means comprising a constantly rotating member and a member carried by said impedance controlling means and in rolling engagement with said rotating member, to tend to return said impedance member and said impedance controlling means to said predetermined relationship.

6. A device for providing a signal which is proportional to the first derivative of a condition, and including: a member movable in accordance with said condition; a variable impedance means mounted for movement with said member; a cylinder adapted to be rotated about its axis; operating means pivotally attached to said member and connected to said impedance means to vary the latter; and a roller carried by said operating means so as to bear against said cylinder with its axis normally parallel to the axis of said cylinder and be rotated thereby, said roller, said cylinder, and said operating means cooperating to restrain movement of a portion of said means with respect to said member and thereby operate said impedance means, and to tend to return said means to its normal position and thereby operate said impedance means in the opposite direction.

7. A device for providing a signal which is proportional to the first derivative of a condition, and including: a member linearly movable in accordance with said condition; a variable impedance means mounted on said member and moving therewith; a cylinder held against translation and adapted to be rotated about its axis, and mounted with its axis parallel to the line of movement of said member; operating means pivotally attached to said member and operating said impedance means by pivoting; and a roller carried by said operating means so as to bear against said cylinder with its axis normally parallel to the axis of said cylinder and be rotated thereby, said roller, said cylinder, and said operating means cooperating to cause said operating means to pivot with respect to said member when said member is moved, and to tend to cause said operating means to return to its normal position.

8. A device for providing a signal proportional to the velocity of deviation of a craft about an axis and including: means moved in accordance with amount of deviation of said craft about an axis; control means operated by movement of an element thereof and mounted for movement with said first member; operating means adapted to move said element; a rotating cylinder held against translation and mounted with its axis of rotation parallel to the line of movement of said control means; and a roller attached to said operating means and adapted to bear against said cylinder and be rotated thereby, said operating means, said roller, and said cylinder cooperating to form a means which restrains the movement of said operating means to cause movement thereof with respect to said control means when said first means is moved, and which tends to return said operating means to its normal position with respect to said control means.

9. A device for providing a signal proportional to the velocity of deviation of a craft about an axis, and including: means adapted to indicate the amount of deviation of said craft about said axis; a member connected to said means and linearly moved thereby in accordance with the extent of said deviation; a resistor connected to said member for movement therewith; a wiper bearing against said resistor and pivotally attached to said member, whereby said wiper may be caused to bear against different portions of said resistor; a rotating cylinder held against translation and mounted with its axis of rotation parallel to the line of movement of said member; and a roller attached to said wiper and adapted to bear against said cylinder and be rotated thereby, said roller, said wiper, and said cylinder cooperating to form a means which restrains the movement of a point on said wiper displaced from its pivot to cause movement of said wiper with respect to said resistor when said member is moved, and which tends to return said wiper to its normal position with respect to said resistance.

10. In control apparatus of the character described, an element comprising in combination: a resistor; a wiper pivoted to traverse said resistor; means for shifting said resistor endwise; and means for holding a point on said wiper, displaced from said pivot, to cause said wiper to swing about its pivot and thereby move endwise along said resistor as said resistor is shifted endwise, said last mentioned means being also operative to swing said wiper back toward its starting point on said resistor following each endwise shifting movement of said resistor.

11. In control apparatus of the character described, a control element comprising in combination: a resistor; a wiper pivoted to traverse said resistor; means for shifting said resistor endwise; and means for restraining said wiper at a point displaced from its pivot point to cause said wiper to swing about said pivot and thereby move endwise along said resistor as the latter is shifted endwise, said last mentioned means including a roller attached to said wiper, and a rotating member engaging and rotating said roller to exert a force on said wiper to swing the latter back toward its starting point along said resistor.

12. A control device adapted to provide a signal upon movement of a responsive means, said device including: a slidable member adapted to be positioned by said responsive means; a first resistance; a first wiper mounted on said slidable member and adapted to traverse said first resistance when said slidable member is moved; a second resistor positioned by said slidable member; a pivot positioned by said slidable member and moving in synchronism with said second resistor; a second wiper mounted on said pivot and bearing against said second resistor to make slidable contact therewith; a rotating cylinder held against translation and mounted with its axis parallel to the line of movement of said pivot and said second resistor; and a roller connected to said second wiper so that when said wiper is in its normal position, the axis of said roller is parallel to the axis of said cylinder, said roller bearing against said cylinder and being rotated thereby, said roller, said cylinder, and said second wiper forming a means to restrain the movement of a point on said wiper displaced from said pivot when said slidable member is moved whereby said second wiper is caused to pivot and thereby traverse a portion of said resistor, said last mentioned means tending to restore said wiper to its normal position, said first wiper and said first resistor cooperating to provide a signal varying in accordance with the displacement of said slidable member, and said second wiper and said second resistor cooperating to provide a signal varying in accordance with the rate of displacement of said slidable member.

GEORGE L. BORELL.
DANIEL G. TAYLOR.

REFERENCES CITED

The following references are of record in the file of this patent:

UNITED STATES PATENTS

| Number | Name | Date |
|---|---|---|
| 1,703,317 | Minorsky | Feb. 26, 1929 |
| 2,005,986 | Behr | June 25, 1935 |
| 2,014,825 | Watson | Sept. 17, 1935 |
| 2,033,015 | Thompson | Mar. 3, 1936 |
| 2,278,396 | Saur | Mar. 31, 1942 |
| 2,385,203 | Hanna et al. | Sept. 18, 1945 |